(12) United States Patent
Ishizuka (10) Patent No.: US 9,454,517 B2
(45) Date of Patent: Sep. 27, 2016

(54) DEVICE, METHOD, AND COMPUTER-READABLE RECORDING MEDIUM

(71) Applicant: KYOCERA Corporation, Kyoto (JP)

(72) Inventor: Yuka Ishizuka, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 150 days.

(21) Appl. No.: 13/722,338

(22) Filed: Dec. 20, 2012

(65) Prior Publication Data

US 2013/0167021 A1 Jun. 27, 2013

(30) Foreign Application Priority Data

Dec. 21, 2011 (JP) ................................. 2011-279836

(51) Int. Cl.
G06F 17/24 (2006.01)
G06F 3/0488 (2013.01)

(52) U.S. Cl.
CPC ........... *G06F 17/24* (2013.01); *G06F 3/04886* (2013.01)

(58) Field of Classification Search
CPC ....................................................... G06F 17/24
USPC ........................................................ 715/256
See application file for complete search history.

(56) References Cited

U.S. PATENT DOCUMENTS

| | | | |
|---|---|---|---|
| 7,030,861 B1 | 4/2006 | Westerman et al. | |
| 2009/0158191 A1* | 6/2009 | Varanda | 715/773 |
| 2010/0304793 A1* | 12/2010 | Kim et al. | 455/566 |
| 2012/0192093 A1* | 7/2012 | Migos et al. | 715/773 |

FOREIGN PATENT DOCUMENTS

| | | | |
|---|---|---|---|
| JP | H3-174617 A | 7/1991 | |
| JP | 9-152951 A | 6/1997 | |
| JP | 2002-14760 A | 1/2002 | |
| JP | 2002014760 * | 1/2002 | ............... G06F 3/00 |
| JP | 2004-341813 A | 2/2004 | |
| WO | 2008/086302 A1 | 7/2008 | |

OTHER PUBLICATIONS

Notice of Reasons for Rejection issued to JP Application No. 2011-279836, mailed Mar. 10, 2015.
Mutsumi Shiratori, Illustrations of Windows7 comprehensive version (the first edition), Mainichi Communications Inc., Oct. 22, 2009, p. 112.
Office Action mailed Oct. 27, 2015, corresponding to Japanese Patent Application No. 2011-279836, for which an explanation of relevance is attached.
Office Action in JP Application No: 2011-279836, mailed May 10, 2016, for which an explanation of relevance is attached.

* cited by examiner

*Primary Examiner* — Peiyong Weng
(74) *Attorney, Agent, or Firm* — Hauptman Ham, LLP (57) ABSTRACT

An object of the present invention is to provide a device, a method, and a computer-readable recording medium, all of which reduce the processing load when a document is opened, and improve the operability for editing a document. A smartphone includes a touch-screen display and a controller. The controller displays a virtual keyboard and a document area which displayed an editing document inputted via the virtual keyboard, on the touch-screen display. The controller maintains displaying of the virtual keyboard while switching the editing document over from a first document to the second document, in a case in which a touch operation to switch the editing document over from the first document to the second document is performed.

9 Claims, 7 Drawing Sheets

DEVICE, METHOD, AND COMPUTER-READABLE RECORDING MEDIUM

CROSS-REFERENCE TO RELATED APPLICATIONS

This application is based on and claims the benefit of priority from Japanese Patent Application No. 2011-279836 filed on 21 Dec. 2011, the content of which is incorporated herein by reference.

BACKGROUND OF THE INVENTION

1. Field of the Invention

The present invention relates to a device, a method, and a computer-readable recording medium. In particular, the present invention relates to a device having a touch-screen display, a method for controlling the device, and a computer-readable recording medium storing a program for controlling the device.

2. Related Art

A device including a touch-screen display has been known. Examples of the device including the touch-screen display include, for example, a smartphone and a tablet. The device including the touch-screen display detects gestures of a finger or a stylus pen via the touch-screen display. The device including the touch-screen display is operated in accordance with the gestures thus detected. Examples of operations in accordance with detected gestures are disclosed in, for example, PCT International Publication No. WO 2008/086302.

Basic operations of a device including a touch-screen display are implemented by an OS (Operating System) such as Android (registered trademark), BlackBerry (registered trademark) OS, Symbian (registered trademark) OS, iOS, Windows (registered trademark) Phone, etc. installed in the device.

SUMMARY OF THE INVENTION

Incidentally, the device displays a virtual keyboard on a touch-screen display in order to input characters when a document or the like is edited. In a case in which the editing of the document is terminated, and a new document is opened, the device temporarily cancels the displaying of the virtual keyboard, opens the new document, and then displays the virtual keyboard again. In this way, since the virtual keyboard is terminated and re-displayed in a repeated manner each time a new document is opened, the processing load has been incurred.

Accoring to an aspect, a device includes a touch-screen display and a controller. The touch-screen display displays a virtual keyboard and a document area which displayed an editing document inputted via the virtual keyboard. In a case in which a touch operation to switch the editing document over from the first document to a second document is performed, the controller maintains displaying of the virtual keyboard while switching the editing document over from the first document to the second document.

Accoring to another aspect, a method for editing a document displayed on a touch-screen display in a device including the touch-screen displayis provided. The method includes the steps of: displaying a virtual keyboard and a document area which displayed an editing document inputted via the virtual keyboard, on the touch-screen display, by a controller provided to the device; and maintaining displaying of the virtual keyboard while switching the editing document over from a first document to a second document by the controller, in a case in which a touch operation to switch the editing document over from the first document to the second document is performed.

Accoring to another aspect, a computer-readable recording medium that stores a program for editing a document displayed on a touch-screen display in a device including the touch-screen display is provided. The program causes the device to execute the steps of: displaying a virtual keyboard and a document area which displayed an editing document inputted via the virtual keyboard, on the touch-screen display; and maintaining displaying of the virtual keyboard while switching the editing document over from a first document to a second document by the controller, in a case in which a touch operation to switch the editing document over from the first document to the second document is performed.

DETAILED DESCRIPTION OF THE INVENTION

An embodiment for carrying out the present invention is described in detail with reference to the drawings. A smartphone is hereinafter described as an example of a device including a touch-screen display.

Embodiment

Figure 1:
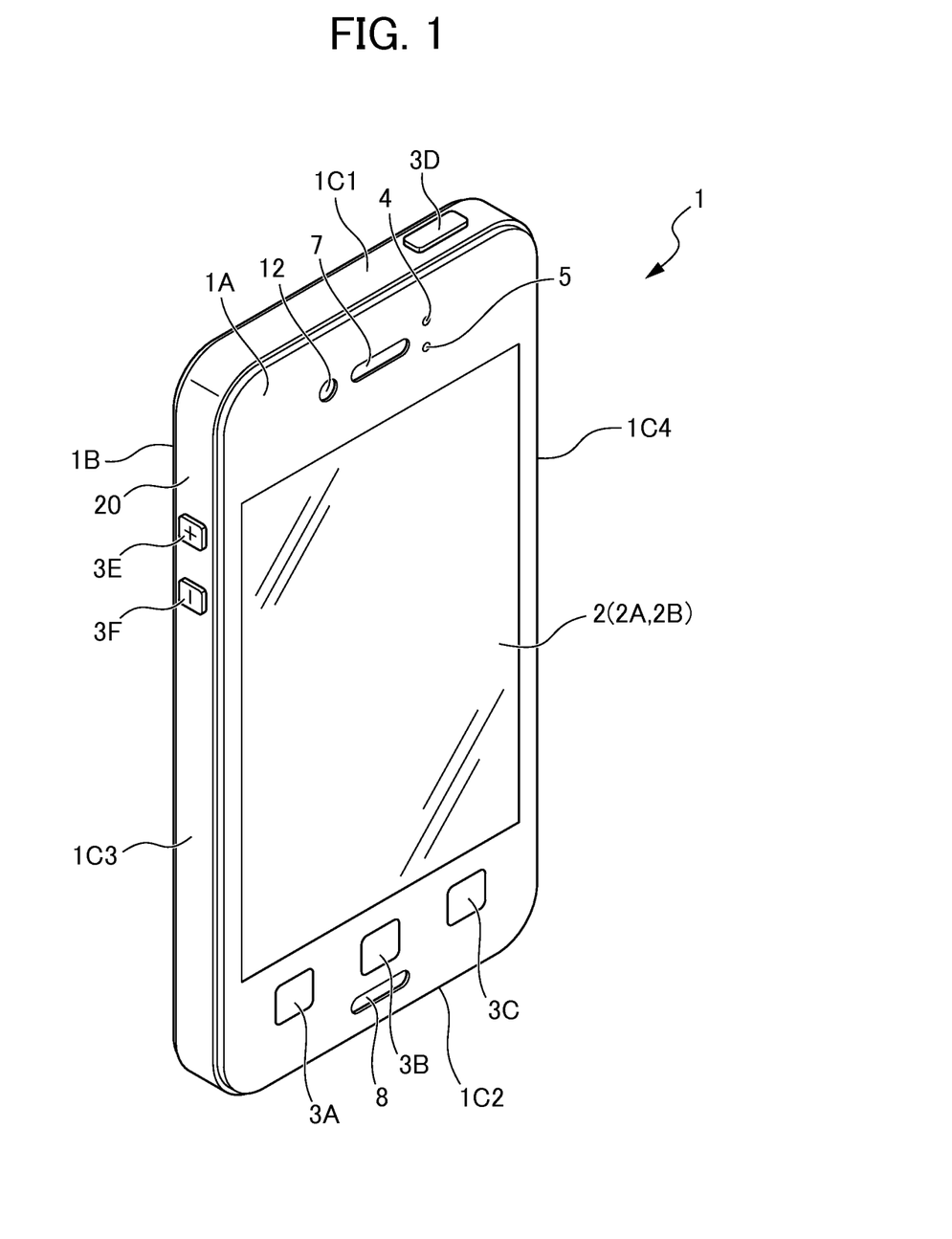
FIG. 1 is a perspective view showing an external appearance of a smartphone according to an embodiment.
Figure 2:
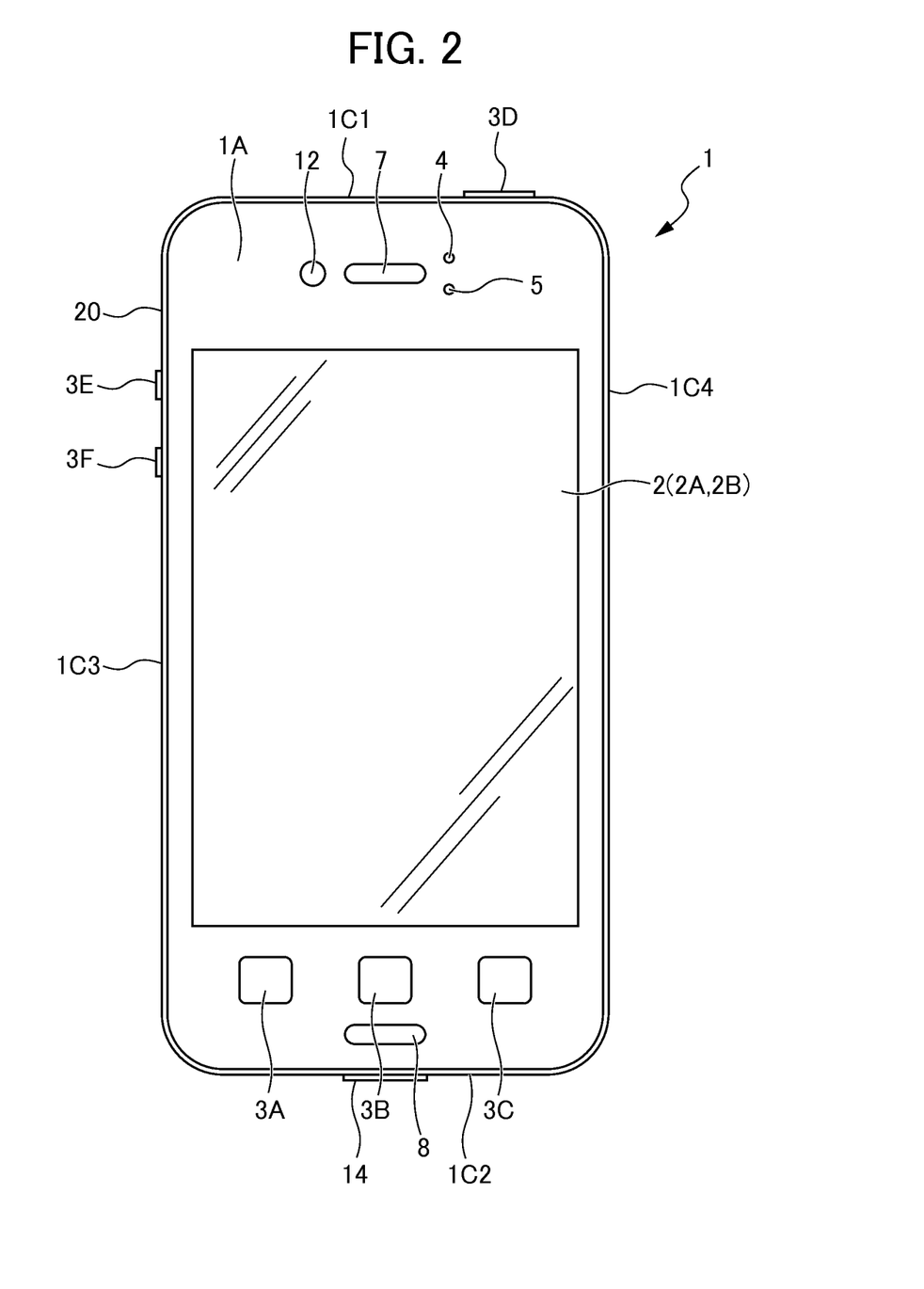
FIG. 2 is a front view showing the external appearance of the smartphone according to the embodiment.
Figure 3:
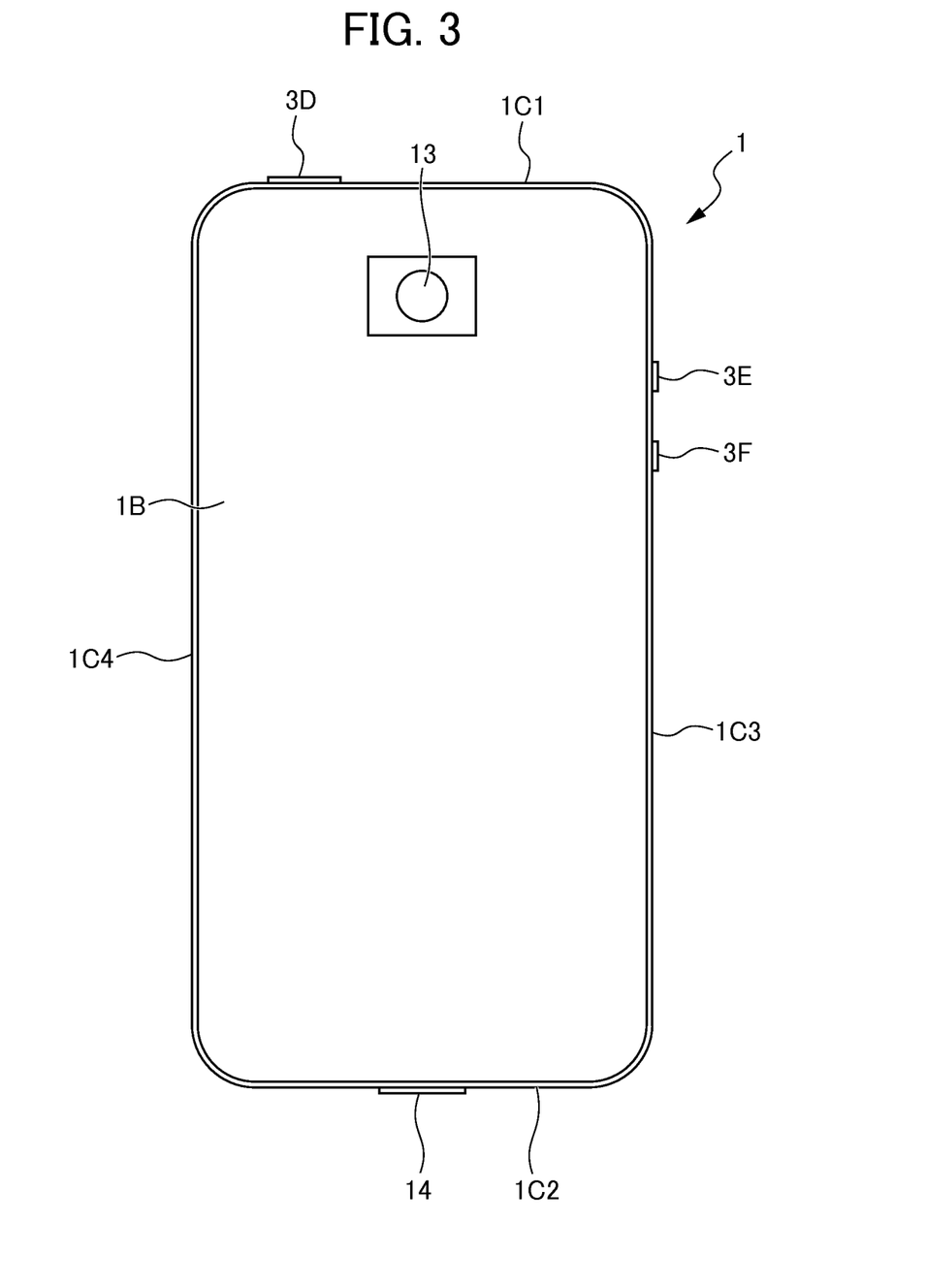
FIG. 3 is rear view showing the external appearance of the smartphone according to the embodiment.

Descriptions are provided for an external appearance of a smartphone 1 according to the embodiment with reference to FIGS. 1 to 3. As shown in FIGS. 1 to 3, the smartphone 1 has a housing 20. The housing 20 has a front face 1A, a back face 1B, and side faces 1C1 to 1C4. The front face 1A is a front face of the housing 20. The back face 1B is a back face of the housing 20. The side faces 1C1 to 1C4 are side faces that connect the front face 1A and the back face 1B. In the following descriptions, the side faces 1C1 to 1C4 may be collectively referred to as a side face 1C without specifying which face.

On the front face 1A, the smartphone 1 has a touch-screen display 2, buttons 3A to 3C, an illuminance sensor 4, a proximity sensor 5, a receiver 7, a microphone 8, and a camera 12. The smartphone 1 has a camera 13 in the back face 1B. The smartphone 1 has buttons 3D to 3F and an external interface 14 in the side face 1C. In the following descriptions, the buttons 3A to 3F may be collectively referred to as a button 3 without specifying which button.

The touch-screen display 2 has a display 2A and a touch screen 2B. The display 2A includes a display device such as a liquid crystal display, an organic electro-luminescence panel, or an inorganic electro-luminescence panel. The display 2A displays characters, images, symbols, graphics or the like.

The touch screen 2B detects a touch by a finger, a stylus pen or the like to the touch-screen display 2. The touch screen 2B detects a position where a plurality of fingers, the stylus pen or the like touch the touch-screen display 2.

A detection method for the touch screen 2B may be any method such as a capacitive sensing method, a resistor film method, a surface acoustic wave method (or an ultrasonic sensing method), an infrared ray method, and an electromagnetic induction method. In the following, for the purpose of simplifying descriptions, the fingers, the stylus pen or the like may be simply referred to as a "finger", a touch by which to the touch-screen display 2 is detected by the touch screen 2B.

The smartphone 1 distinguishes a type of a gesture, based on a touch(s), a touched position(s), a touching period of time, or a touching number of times, detected by the touch screen 2B. The gesture is an operation that is performed on the touch-screen display 2. Gestures that are distinguished by the smartphone 1 include a touch, a long touch, a release, a swipe, a tap, a double tap, a long tap, a drag, a flick, a pinch-in, a pinch-out, and the like.

The touch is a gesture of a single touch. More specifically, the touch is a gesture of a finger that touches (for example, a surface of) the touch-screen display 2. The smartphone 1 distinguishes the gesture of a finger touching the touch-screen display 2 as a touch. The long touch is a gesture of a finger touching the touch-screen display 2 for more than a certain period of time. The smartphone 1 distinguishes the gesture of a finger touching the touch-screen display 2 for more than a certain period of time as a long touch.

The release is a gesture of a finger being released from the touch-screen display 2. The smartphone 1 distinguishes the gesture of a finger being released from the touch-screen display 2 as a release. The swipe is a gesture of a finger moving while touching the touch-screen display 2. The smartphone 1 distinguishes the gesture of a finger moving while touching the touch-screen display 2 as a swipe.

The tap is a consecutive gesture of touch and release. The smartphone 1 distinguishes the consecutive gesture of touch and release as a tap. The double tap is a gesture of repeating a consecutive gesture of touch and release two times. The smartphone 1 distinguishes the gesture of repeating a consecutive gesture of touch and release two times as a double tap.

The long tap is a consecutive gesture of a long touch and release. The smartphone 1 distinguishes the consecutive gesture of a long touch and release as a long tap. The drag is a gesture of swiping from a starting point where a movable object is displayed. The smartphone 1 distinguishes the gesture of swiping from a starting point where a movable object is displayed as a drag.

The flick is a consecutive gesture of touch and release of a finger moving at a high-speed in one direction. The smartphone 1 distinguishes the gesture of touch and release of a finger moving at a high-speed in one direction as a flick. The flick includes: an upward flick of a finger moving in an upward direction on the screen; a downward flick of a finger moving in a downward direction on the screen; a rightward flick of a finger moving in a rightward direction on the screen; a leftward flick of a finger moving in a leftward direction on the screen; and the like.

The pinch-in is a gesture of a plurality of fingers swiping in mutually approaching directions. The smartphone 1 distinguishes the gesture of a plurality of fingers swiping in mutually approaching directions as a pinch-in. The pinch-out is a gesture of a plurality of fingers swiping in mutually receding directions. The smartphone 1 distinguishes the gesture of a plurality of fingers swiping in mutually receding directions as a pinch-out.

The smartphone 1 is operated in accordance with these gestures that are distinguished via the touch screen 2B. Therefore, intuitive and easy-to-use operability is achieved for a user. An operation, which is performed by the smartphone 1 in accordance with a gesture thus distinguished, is different depending on a screen that is displayed on the touch-screen display 2.

Figure 4:
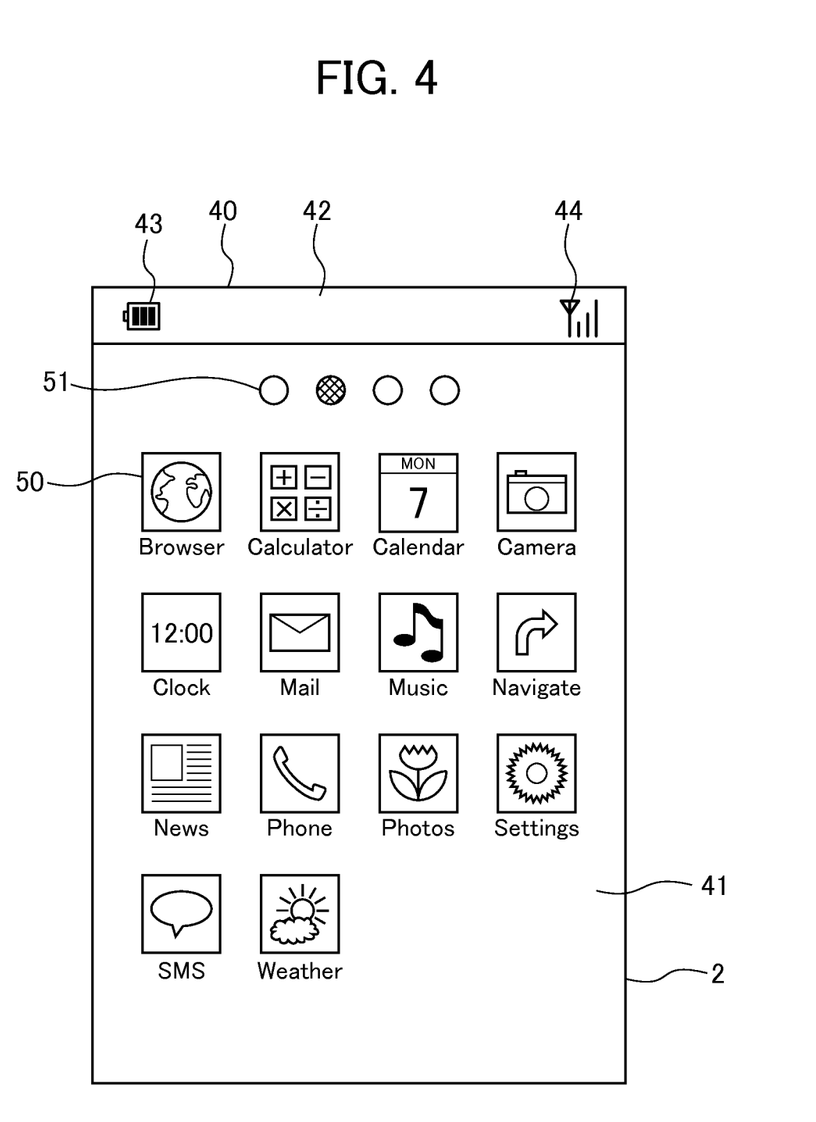
FIG. 4 is a diagram showing an example of a home screen.

An example of a screen displayed on the display 2A is described with reference to FIG. 4. FIG. 4 shows an example of a home screen. The home screen may be called a desktop or an idle screen. The home screen is displayed on the display 2A. The home screen is a screen for allowing the user to select which application to be executed among applications installed in the smartphone 1. When an application is selected in the home screen, the smartphone 1 executes the application in the foreground. The screen of the application executed in the foreground is displayed on the display 2A.

The smartphone 1 can arrange icons in the home screen. A plurality of icons 50 are arranged in the home screen 40 shown in FIG. 4. The icons 50 are previously associated with the applications installed in the smartphone 1, respectively. When the smartphone 1 detects a gesture on an icon 50, an application associated with the icon 50 is executed. For example, when the smartphone 1 detects a tap on an icon 50 associated with a mail application, the mail application is executed. Here, for example, the smartphone 1 interprets the gesture on a position (area), which corresponds to a display position (area) of the icon 50 on the touch-screen display 2, as an instruction to execute an application associated with the icon 50.

The icon 50 includes an image and a character string. The icon 50 may include a symbol or graphics in place of the image. The icon 50 may not include any one of the image or the character string. The icons 50 are arranged in accordance with a predetermined rule. A wall paper 41 is displayed behind the icons 50. The wall paper may also be called a photo screen or a back screen. The smartphone 1 can use an arbitrary image as the wall paper 41. An arbitrary image is determined as the wall paper 41, for example, in accordance with the setting by the user.

The smartphone 1 can increase and decrease the number of home screens. The smartphone 1 determines the number of home screens, for example, in accordance with the setting by the user. Even in a case in which there are a plurality of home screens, the smartphone 1 selects a single home screen from the plurality of home screens, and displays the single home screen on the display 2A.

The smartphone 1 displays one or more locators on the home screen. The number of the locators coincides with the number of the home screens. The locator indicates the position of the currently displayed home screen. The locator corresponding to the currently displayed home screen is displayed in a manner different from the other locators.

Four locators 51 are displayed in the example shown in FIG. 4. This indicates that there are four home screens 40. In the example shown in FIG. 4, the second symbol (locator) from the left is displayed in a manner different from the other symbols (locators). This indicates that the second home screen from the left is currently displayed.

When the smartphone 1 detects a particular gesture while displaying the home screen, the home screen displayed on the display 2A is switched. For example, when the smartphone 1 detects a rightward flick, the home screen displayed on the display 2A is switched over to a next home screen to the left. When the smartphone 1 detects a leftward flick, the home screen displayed on the display 2A is switched over to a next home screen to the right.

An area 42 is provided at the top edge of the display 2A. A remaining-level mark 43 indicating a remaining level of the rechargeable battery, and a radio wave level mark 44 indicating field intensity of radio waves for communication are displayed in the area 42. In the area 42, the smartphone 1 may display current time, weather information, active applications, a type of communication system, a telephone status, a device mode, events occurred to the device, etc. In this way, the area 42 is used for making various notifications to the user. The area 42 may be provided as another screen separate from the home screen 40. The position of providing the area 42 is not limited to the top edge of the display 2A.

The home screen 40 shown in FIG. 4 is an example, and shapes of various elements, layouts of various elements, the number of home screens 40, and the manner of various operations on the home screen 40 may not be as described in the above descriptions.

Figure 5:
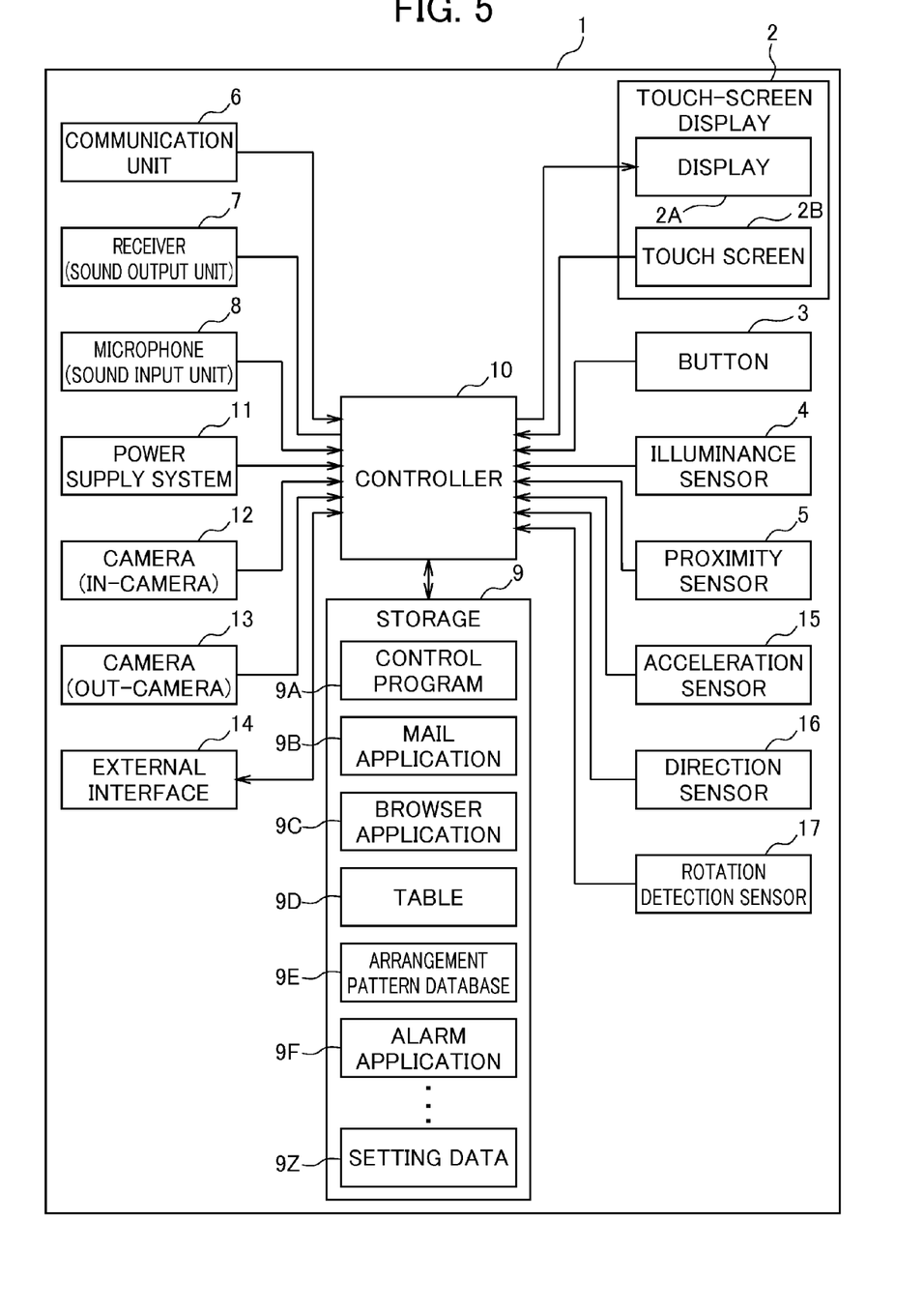
FIG. 5 is a block diagram showing functions of the smartphone according to the embodiment.

FIG. 5 is a block diagram showing a configuration of the smartphone 1. The smartphone 1 has the touch-screen display 2, the button 3, the illuminance sensor 4, the proximity sensor 5, a communication unit 6, the receiver 7, the microphone 8, a storage 9, a controller 10, cameras 12 and 13, an external interface 14, an acceleration sensor 15, a direction sensor 16, and a rotation detection sensor 17.

As described above, the touch-screen display 2 has the display 2A and the touch screen 2B. The display 2A displays characters, images, symbols, graphics or the like. The smartphone 1 detects a gesture via the touch screen 2B.

The button 3 is operated by the user. The button 3 has the buttons 3A to 3F. The controller 10 collaborates with the button 3 to detect an operation of the button. The operation of the button is, for example, a click, a double click, a push, and a multi-push.

For example, the buttons 3A to 3C are a home button, a back button or a menu button. For example, the button 3D is a power on/off button of the smartphone 1. The button 3D may also serve as a sleep/wake-up button. For example, the buttons 3E and 3F are volume buttons.

The illuminance sensor 4 detects illuminance. For example, the illuminance is intensity, brightness, brilliance, etc. of light. For example, the illuminance sensor 4 is used for adjusting the brilliance of the display 2A.

The proximity sensor 5 detects presence of a proximate object in a contactless manner. The proximity sensor 5 detects, for example, a face being brought close to the touch-screen display 2.

The communication unit 6 performs wireless communication. Communication methods implemented by the communication unit 6 are wireless communication standards. For example, the wireless communication standards include cellular phone communication standards such as 2G, 3G and 4G. For example, the cellular phone communication standards include LTE (Long Term Evolution), W-CDMA, CDMA2000, PDC, GSM (registered trademark), PHS (Personal Handy-phone System), etc. For example, the wireless communication standards include WiMAX (Worldwide Interoperability for Microwave Access), IEEE 802.11, Bluetooth (registered trademark), IrDA, NFC (Near Field Communication), etc. Communication unit 6 may support one or more of the communication standards described above.

When a sound signal is transmitted from the controller 10, the receiver 7 outputs the sound signal as sound. The microphone 8 converts sound such as the user's voice into a sound signal, and transmits the sound signal to the controller 10. The smartphone 1 may further have a speaker(s) in addition to the receiver 7. The smartphone 1 may further have a speaker(s) in place of the receiver 7.

The storage 9 stores programs and data. The storage 9 is also utilized as a working area for temporarily storing processing results of the controller 10. The storage 9 may include an arbitrary storage device such as a semi-conductor storage device and a magnetic storage device. The storage 9 may include several types of storage devices. The storage 9 may include combination of a portable storage medium such as a memory card with a reader for the storage medium.

The programs stored in the storage 9 include: applications that are executed in the foreground or the background; and a control program that assists operations of the applications. For example, an application causes the display 2A to display a predetermined screen, and causes the controller 10 to execute processing in accordance with a gesture detected by the touch screen 2B. The control program is, for example, an OS. The applications and the control program may be installed in the storage 9 via wireless communication by the communication unit 6 or via a storage medium.

The storage 9 stores, for example, a control program 9A, a mail application 9B, a browser application 9C, and setting data 9Z. The mail application 9B provides electric mail functions of creating, transmitting, receiving and displaying electric mail. The browser application 9C provides a web browsing function of displaying web pages. A table 9D stores various tables such as a key assignment table. An arrangement pattern database 9E stores patterns of arrangement such as arrangement of icons displayed on the display 2A. The setting data 9Z provides various set-up functions regarding operations of the smartphone 1.

The control program 9A provides functions regarding a variety of control for operating the smartphone 1. For example, the control program 9A implements a telephone call function by controlling the communication unit 6, the receiver 7, the microphone 8, etc. The functions provided by the control program 9A include functions of executing a variety of control such as changing the information displayed on the display 2A in accordance with a gesture detected via the touch screen 2B. The functions provided by the control program 9A may be utilized in combination with functions provided by other programs such as the mail application 9B.

The controller 10 is, for example, a CPU (Central Processing Unit). The controller 10 may be an integrated circuit such as an SoC (System-on-a-chip) that integrates other constituent elements such as the communication unit 6. The controller 10 comprehensively controls the operations of the smartphone 1 to implement various functions.

More specifically, the controller 10 implements various functions by referring to data stored in the storage 9 as necessary, executing instructions included in a program stored in the storage 9, and controlling the display 2A, the communication unit 6, etc. The controller 10 may change the control in accordance with a result of detection by various detecting units such as the touch screen 2B, the button 3 and the acceleration sensor 15.

For example, the controller 10 executes the control program 9A to execute a variety of control such as changing the information displayed on the display 2A in accordance with a gesture detected via the touch screen 2B.

The camera 12 is an in-camera that photographs an object from a side of the front face 1A. The camera 13 is an out-camera that photographs an object from a side of the back face 1B.

The external interface 14 is a terminal, to which another device is connected. The external interface 14 may be a universal terminal such as USB (Universal Serial Bus), HDMI (High-Definition Multimedia Interface), Light Peak (Thunderbolt), and an earpiece-microphone connector. The external interface 14 may be a terminal designed for exclusive use, such as a Dock connector. A device that is connected to the external interface 14 includes, for example, an external storage, a speaker, and a communication device.

The acceleration sensor 15 detects a direction and level of acceleration that acts on the smartphone 1. The direction sensor 16 detects an orientation of geomagnetism. The rotation detection sensor 17 detects rotation of the smartphone 1. Results of such detection by the acceleration sensor 15, the direction sensor 16 and the rotation detection sensor 17 are utilized in combination to detect change in the position and posture of the smartphone 1.

The smartphone 1 as thus constituted displays a virtual keyboard on the touch-screen display 2, when a document is edited by a character input application (for example, a document preparation application such as a memo pad application). In response to detecting a touch to the virtual keyboard, the smartphone 1 inputs a character displayed in a position of the virtual keyboard, the touch to which was detected.

By maintaining the displaying of the virtual keyboard when editing a document with a character input application, the smartphone 1 can reduce the processing load for opening the document, and can improve the operability for editing the document. Descriptions are hereinafter provided for specific processing.

FIGS. 6(a) to 6(g) are diagrams showing a display screen 60 that is displayed on the touch-screen display 2 when a document is edited with the character input application. Here, the display screen 60 means the entire display area of the touch-screen display 2.

Figure 6:
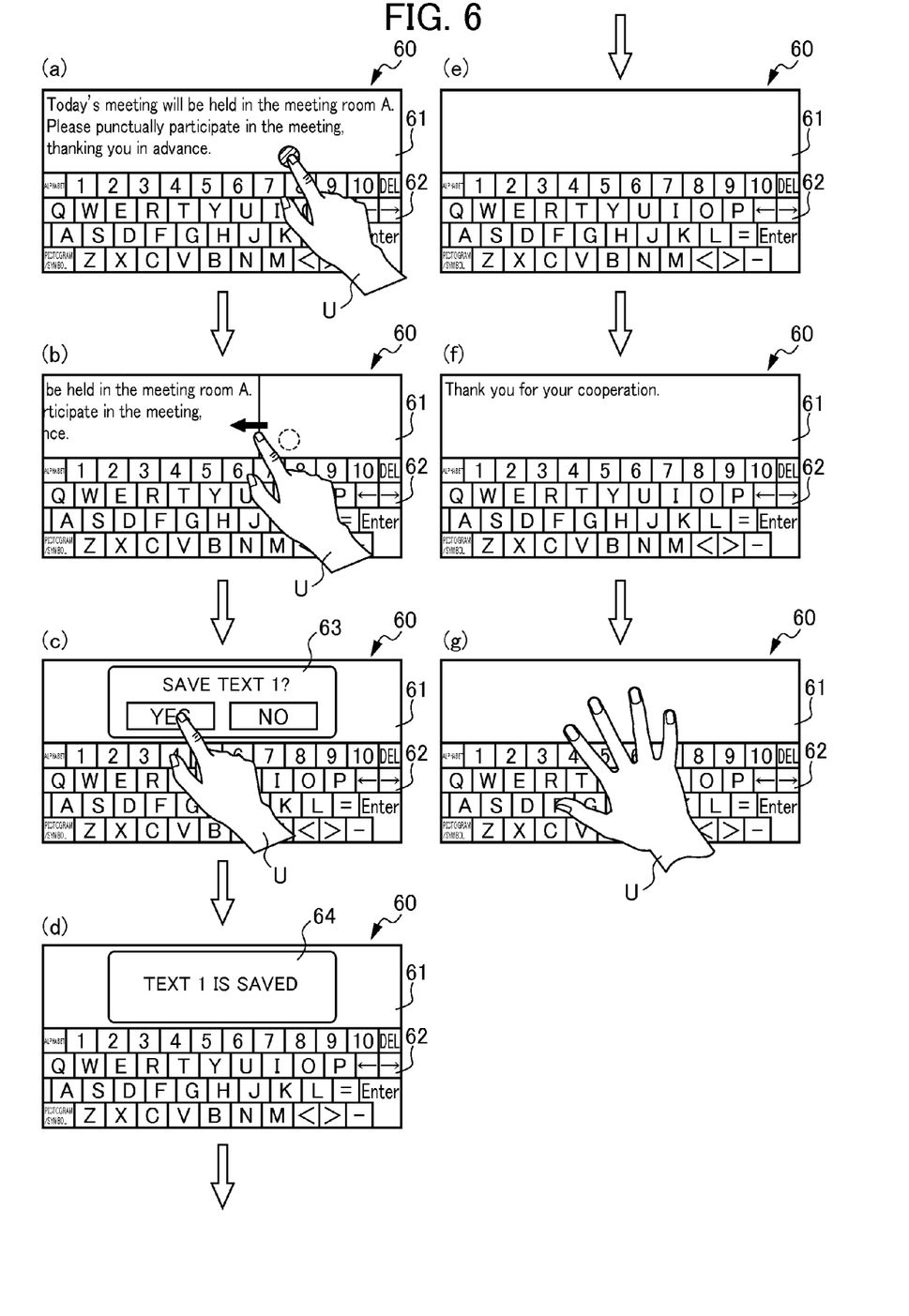
FIG. 6 is a diagram showing a display screen displayed on a touch-screen display, according to the embodiment.

As shown in FIG. 6(a), when a document is edited with the character input application, the controller 10 displays a document area 61 and a virtual keyboard 62 on the display screen 60. The controller 10 displays the document area 61 in an upper area of the display screen 60, and displays the virtual keyboard 62 in a lower area of the display screen 60.

In response to a touch to the virtual keyboard 62 by a user U, the controller 10 displays a character corresponding to the point thus touched, in the document area 61.

As shown in FIGS. 6(a) and 6(b), when the controller 10 detects a flick in the document area 61 by the user U, the controller 10 terminates the editing document displayed in the document area 61, and performs displaying such that the entire document displayed in the document area 61 moves in a direction of the flick.

In the example shown in FIG. 6(b), when the controller 10 detects a flick, the controller 10 terminates the editing document displayed in the document area 61, and performs displaying such that the document displayed in the document area 61 moves to the left.

After displaying such an effect, the controller 10 displays a dialog box 63 for confirming whether the document should be stored, the dialog box 63 being superimposed on the document area 61, as shown in FIG. 6(c). When a touch to "YES" in the dialog box 63 is detected, the controller 10 stores the currently edited document into the storage 9, and displays a message box 64 indicating that the currently edited document is stored into the storage 9, the message box 64 being superimposed on the document area 61 (see FIG. 6(d)). The controller 10 then displays a new document in the document area 61 (see FIG. 6(e)). The new document is, for example, a blank document.

When a touch to "NO" in the dialog box 63 is detected, the controller 10 discards data of the currently edited document, and displays a new document in the document area 61 (see FIG. 6(e)).

In the example shown in FIGS. 6(c) and 6(d), the controller 10 displays the dialog box 63 and the message box 64 in order to confirm whether the document should be stored. However, the document may be automatically stored into the storage without confirming whether the document should be stored.

As shown in FIGS. 6(a) to 6(e) described above, when the controller 10 terminates the editing document displayed in the document area 61, and a touch operation to switch the editing document over from a first document to a new document is performed, the controller 10 maintains displaying of the virtual keyboard 62 while switching the editing document over from the first document to the new document.

In general, in a device that displays a virtual keyboard on a touch-screen display, when the editing document displayed in a display area is terminated, and an operation to switch over to the editing of another document is performed, the displaying of the virtual keyboard is temporarily cancelled. As a result, when the editing is switched over to the editing of a new document, the type of characters to be input by the virtual keyboard that was displayed before the switching over may be changed. As an example in which the type of characters is changed, there is a conceivable case in which a type of characters is changed to that of default setting such that, for example, Japanese hiragana or katakana characters are changed to alphabetic characters. In this case, each time a document is switched over to a new document, the user has been required to change the type of characters.

On the other hand, with the smartphone 1 according to the present embodiment, the editing document displayed in the document area 61 is switched the editing document over from a first document to a new document, while maintaining the displaying of the virtual keyboard 62. As a result, since the smartphone 1 maintains the displaying of the virtual keyboard 62 that is easy for the user to input characters, the smartphone 1 can reduce the processing load when a document is opened. The user does not have to change the type of characters, and the operability for editing a new document is improved.

After an operation to switch over to the editing of a new document is performed, while the editing of the document displayed in the document area 61 is switched over to the editing of a new document, the controller 10 maintains the displaying of the virtual keyboard 62. For example, an example of an operation to switch over to the editing of a new document is a flick in the document area 61. As shown in FIG. 6(f), while switching over to the editing of a new document, the controller 10 stores data of characters that are input via the virtual keyboard 62, into the storage 9. Upon completion of the switching over to the editing of a new document, the controller 10 displays the data of the characters stored in the storage 9, in the document area 61. In this way, with the smartphone 1, characters can be input while the editing of the document displayed in the document area 61 is switched over to the editing of a new document; therefore, the operability for editing a new document is further improved.

When the controller 10 detects a flick in the document area 61 as an operation to switch over to the editing of a new document, the editing of the currently edited document is switched over to the editing of a new document, while maintaining the displaying of the virtual keyboard 62. Therefore, the smartphone 1 can switch over to the editing of a new document without performing any operations on the virtual keyboard 62 that is desired to be continuously displayed, and the processing load for opening a document can be reduced. The user can intuitively perform an operation to switch over to the editing of a new document.

As shown in FIG. 6(g), when a gesture of covering the entirety of the display screen 60 of the touch-screen display 2 is detected, the controller 10 terminates the character input application that edits documents. In this case, the controller 10 may automatically store the currently edited document into the storage 9, or the controller 10 may automatically discard the currently edited document. The gesture of covering the entirety of the display screen 60 is an example, and the character input application for editing documents may be terminated in response to detecting any other gesture. In this way, since the smartphone 1 terminates the character input application for editing documents in response to detecting a predetermined gesture, the user can intuitively edit documents.

In the above descriptions, the controller 10 switches over from the editing of the currently edited document to the editing of a new document, but the switching over is not limited to the switching over to a new document. For example, the controller 10 may switch over from the editing of the currently edited document to the editing of any other document. For example, in a state where two documents are currently edited and while being switched over, when the controller 10 detects a leftward flick in the document area 61, one document may be switched over to another document, while maintaining the displaying of the virtual keyboard 62. Furthermore, in this case, when the controller 10 detects a rightward flick in the document area 61, the editing of the two currently edited documents may be switched over to the editing of a new document, while maintaining the displaying of the virtual keyboard 62.

Figure 7:
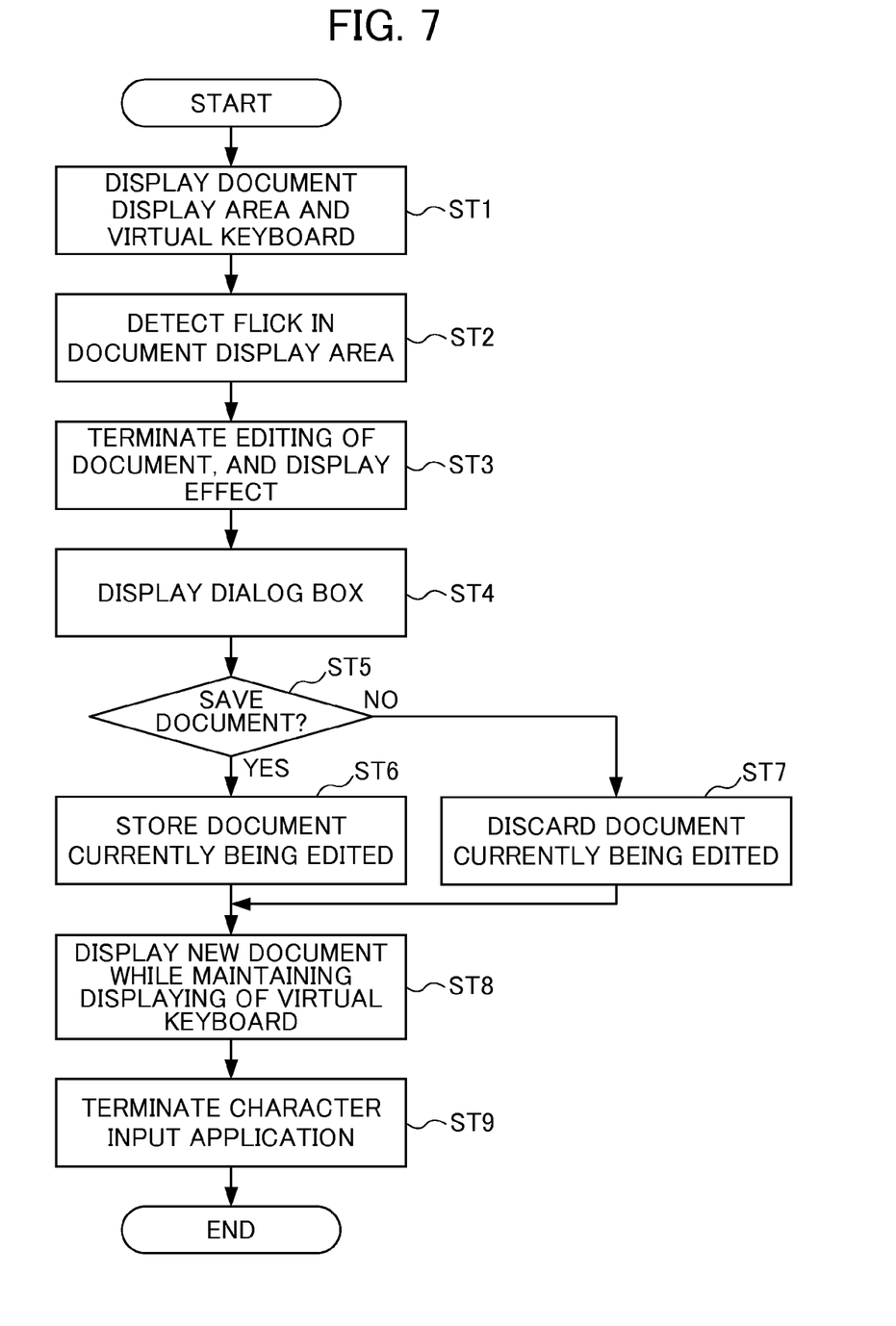
FIG. 7 is a flowchart showing a flow of processing of editing a document, according to the embodiment.

Next, with reference to a flowchart shown in FIG. 7, descriptions are provided for a flow of processing when the smartphone 1 edits documents with the character input application.

In Step ST1, the controller 10 activates the character input application stored in the storage 9, and displays the document area 61 and the virtual keyboard 62 on the touch-screen display 2.

In Step ST2, the controller 10 detects a flick in the document area 61 by the user U.

In Step ST3, the controller 10 terminates the editing of the document displayed in the document area 61, and performs displaying such that the document displayed in the document area 61 moves in a direction of the flick. The controller 10 switches over from the editing of the document displayed in the document area 61 to the editing of a new document, while maintaining the displaying of the virtual keyboard 62.

After displaying such an effect, in Step ST4, the controller 10 displays the dialog box 63 for confirming whether the document should be stored, the dialog box 63 being superimposed on the document area 61.

In Step ST5, the controller 10 determines whether a touch to any one of "YES" or "NO" in the dialog box 63 was detected, i.e. whether the document should be stored. In a case in which the touch to "YES" was detected, i.e. in a case in which the document should be stored, the controller 10 advances the processing to Step ST6. In a case in which the touch to "NO" was detected, i.e. in a case in which the document should be discarded, the controller 10 advances the processing to Step ST7.

In Step ST6, the controller 10 stores data of the currently edited document into the storage 9, and displays the message box 64 indicating that the currently edited document is stored into the storage 9, the message box 64 being superimposed on the document area 61.

In Step ST7, the controller 10 discards the data of the currently edited document. In a case in which a character is input via the virtual keyboard 62 during Steps ST3 to ST7, i.e. while switching over from the editing of the document displayed in the document area 61 to the editing of a new document, the controller 10 stores data of the input character into the storage 9.

In Step ST8, the controller 10 displays a new document in the document area 61, while maintaining the displaying of the virtual keyboard 62. Here, in a case in which a character is input via the virtual keyboard 62 during Steps ST3 to ST7, the controller 10 displays the data of the character stored in the storage 9, in the document area 61.

In Step ST9, in a case in which a gesture of covering the entirety of the display screen 60 of the touch-screen display 2 is detected in a state of any one of Steps ST1 to ST8, the controller 10 terminates the character input application for editing documents, and terminates the processing shown in the present flowchart.

Therefore, the smartphone 1 switches over from the editing of the document displayed in the document display area 61 to the editing of a new document, while maintaining the displaying of the virtual keyboard 62. As a result, since the smartphone 1 maintains the displaying of the virtual keyboard 62 that is easy for the user to input characters, the smartphone 1 reduces the processing load when a document is opened. The user does not have to change the type of virtual keyboards, and the operability for editing a new document is improved.

A part or all of the programs stored in the storage 9 as described in FIG. 5 may be downloaded from other devices via wireless communication by the communication unit 6. A part or all of the programs stored in the storage 9 as described in FIG. 5 may be stored in a storage medium that is readable by a reader included in the storage 9. A part or all of the programs stored in the storage 9 as described in FIG. 5 may be stored in a storage medium such as a CD, a DVD or a Blu-ray that is readable by a reader connected to the external interface 14.

The configuration of the smartphone 1 shown in FIG. 5 is an example, and may be altered as appropriate within the scope without departing from the spirit of the present invention. For example, the number and type of the button(s) 3 are not limited to the example shown in FIG. 5. For example, the smartphone 1 may include buttons with a numeric keypad layout or a QWERTY keyboard layout, in place of the buttons 3A to 3C, as buttons for operations regarding screens. The smartphone 1 may include only a single button and may not include any button, for operations regarding screens. In the example shown in FIG. 5, the smartphone 1 includes two cameras, but the smartphone 1 may include only a single camera, and may not include any camera. In the example shown in FIG. 5, the smartphone 1 includes three types of sensors for detecting the position and posture, but the smartphone 1 may not include some of these sensors, and may include other types of sensors for detecting the position and posture. The illuminance sensor 4 and the proximity sensor 5 may be configured as a single sensor instead of separate sensors.

A characteristic embodiment has been described for the purpose of completely and clearly disclosing the present invention. However, the invention according to the attached claims should not be limited to the above embodiment, and the invention should be configured to embody all modifications and substitutable configurations that can be created by a person skilled in the art within the scope of the basic matter described herein.

For example, each program shown in FIG. 5 may be divided into a plurality of modules, and may be coupled with other programs.

In the above embodiment, the smartphone has been described as an example of a device including a touch-screen display, but the device according to the attached claims is not limited to a smartphone. For example, the device according to the attached claims may be a portable electronic device such as a portable phone, a portable personal computer, a digital camera, a media player, an electronic book reader, a navigator or a gaming machine. The device according to the attached claims may be an electronic device of a standing type such as a desktop PC or a television receiver.

What is claimed is:

1. A device, comprising:
   a single touch-screen display configured to display a virtual keyboard and a document area displaying an editing document inputted via the virtual keyboard; and
   a controller configured to maintain displaying of the virtual keyboard on the single touch-screen display while switching the editing document over from a first document to a second document in a case in which a touch operation to switch the editing document over from the first document to the second document is performed in the document area displayed on the single touch-screen display,
   wherein
   in the case in which the touch operation to switch the editing document over from the first document to the second document is performed, the controller is configured to
      cause the single touch-screen display to display that the first document displayed in the document area moves in a direction of the touch operation, and
      cause the single touch-screen display to display, without superimposing on the virtual keyboard, an indication confirming whether the first document should be stored.

2. The device according to claim 1, wherein the controller is configured to stop an editing of the first document, when the editing document is switched over from the first document to the second document.

3. The device according to claim 1, wherein the controller is configured to cause the single touch-screen display to display character data in the second document, the character data are inputted while switching the editing document over from the first document to second document.

4. The device according to claim 1, wherein, in a case in which a first gesture is detected in the document area as the touch operation, the controller is configured to maintain the displaying of the virtual keyboard while switching the editing document over from the first document to the second document.

5. The device according to claim 1, wherein, in a case in which a second gesture is detected through the single touch-screen display, the controller is configured to stop an editor application that edits documents.

6. A method of editing a document displayed on a single touch-screen display in a device including the single touch-screen display, the method comprising the steps of:
   displaying a virtual keyboard and a document area displaying an editing document inputted via the virtual keyboard on the single touch-screen display, by a controller provided to the device; and
   maintaining displaying of the virtual keyboard on the single touch-screen display while switching the editing document over from a first document to a second document by the controller, in a case in which a touch operation to switch the editing document over from the first document to the second document is performed in the document area displayed on the single touch-screen display,
   wherein
   in the case in which the touch operation to switch the editing document over from the first document to the second document is performed,
      the first document displayed in the document area moves in a direction of the touch operation, and
      an indication confirming whether the first document should be stored is displayed without superimposing on the virtual keyboard.

7. A computer-readable recording non-transitory medium that stores a program for editing a document displayed on a single touch-screen display in a device including the single touch-screen display, the program causing the device to execute the steps of:
   displaying a virtual keyboard and a document area displaying an editing document inputted via the virtual keyboard on the single touch-screen display, by a controller provided to the device; and
   maintaining displaying of the virtual keyboard on the single touch-screen display while switching the editing document over from a first document to a second document by the controller, in a case in which a touch operation to switch the editing document over from the first document to the second document is performed in the document area displayed on the single touch-screen display,
   wherein
   in the case in which the touch operation to switch the editing document over from the first document to the second document is performed,
      the first document displayed in the document area moves in a direction of the touch operation, and
      an indication confirming whether the first document should be stored is displayed without superimposing on the virtual keyboard.

8. The device according to claim 1, wherein in the case in which the touch operation to switch the editing document over from the first document to the second document is performed and the first document displayed in the document area moves in the direction of the touch operation, the controller is configured to display a boundary line at an edge of the first document and move the boundary line together with the first document.

9. The device according to claim 1, wherein, in a state where two documents are currently edited,
   when the touch operation is performed in a first direction, the controller is configured to switch a displayed document in the document area from one of the two documents to the other document, and when the touch operation is performed in a second direction different from the first direction, the controller is configured to switch over from the displayed document to a new document.

* * * * *